(12) United States Patent
Ueki et al.

(10) Patent No.: US 10,312,751 B2
(45) Date of Patent: Jun. 4, 2019

(54) WIRELESS POWER SUPPLY CONTROL SYSTEM AND METHOD FOR PRODUCING DIRECTIVITY INFORMATION

(71) Applicant: OMRON Corporation, Kyoto-shi, Kyoto (JP)

(72) Inventors: Daichi Ueki, Kyoto (JP); Keisuke Saito, Suita (JP)

(73) Assignee: OMRON Corporation, Kyoto-shi (JP)

( * ) Notice: Subject to any disclaimer, the term of this patent is extended or adjusted under 35 U.S.C. 154(b) by 99 days.

(21) Appl. No.: 15/545,370

(22) PCT Filed: Feb. 2, 2016

(86) PCT No.: PCT/JP2016/053022
§ 371 (c)(1),
(2) Date: Jul. 21, 2017

(87) PCT Pub. No.: WO2016/129450
PCT Pub. Date: Aug. 18, 2016

(65) Prior Publication Data
US 2018/0006508 A1    Jan. 4, 2018

(30) Foreign Application Priority Data
Feb. 13, 2015    (JP) ................................ 2015-026998

(51) Int. Cl.
*H02J 50/23* (2016.01)
*H02J 50/80* (2016.01)
(Continued)

(52) U.S. Cl.
CPC .......... *H02J 50/90* (2016.02); *B25J 19/0045* (2013.01); *H02J 50/00* (2016.02); *H02J 50/20* (2016.02);
(Continued)

(58) Field of Classification Search
CPC ........ B25J 19/0045; H02J 50/00; H02J 50/20; H02J 50/23; H02J 50/40; H02J 50/80; H02J 50/90; H04B 7/10
(Continued)

(56) References Cited

U.S. PATENT DOCUMENTS

2009/0264069 A1    10/2009    Yamasuge
2010/0248659 A1    9/2010    Kawabata
(Continued)

FOREIGN PATENT DOCUMENTS

JP    2009-240139 A    10/2009
JP    2013-538548 A    10/2013
(Continued)

OTHER PUBLICATIONS

International Search Report of PCT/JP2016/053022 dated Apr. 26, 2016.
(Continued)

*Primary Examiner* — William Hernandez
(74) *Attorney, Agent, or Firm* — Metrolexis Law Group, PLLC

(57) ABSTRACT

Provided is a wireless power supply control system including a control apparatus controlling driving of one or more driving devices in accordance with a plurality of predetermined driving patterns, a first radio having a directional antenna, and a second radio driven by power supply radio waves transmitted from the first radio. Target driving directivity information corresponding to a target driving pattern acquired by an acquisition unit is selected from among pieces of driving directivity information relating to a directivity applied to the directional antenna, in a state in which driving of the driving devices is controlled by the control apparatus in accordance with the driving patterns, the selected target driving directivity information is applied to
(Continued)

the directional antenna of the first radio, and wireless power supply from the first radio to the second radio is executed.

14 Claims, 7 Drawing Sheets

(51) Int. Cl.
| | |
|---|---|
| *H02J 50/90* | (2016.01) |
| *H04B 7/10* | (2017.01) |
| *H02J 50/00* | (2016.01) |
| *H02J 50/20* | (2016.01) |
| *B25J 19/00* | (2006.01) |

(52) U.S. Cl.
CPC .............. *H02J 50/23* (2016.02); *H02J 50/80* (2016.02); *H04B 7/10* (2013.01)

(58) Field of Classification Search
USPC ............................................. 307/11, 31, 104
See application file for complete search history.

(56) References Cited

U.S. PATENT DOCUMENTS

| | | | |
|---|---|---|---|
| 2011/0244808 | A1 | 10/2011 | Shiotsuki et al. |
| 2013/0297069 | A1 | 11/2013 | Tachiwa |
| 2015/0194845 | A1 | 7/2015 | Homma |
| 2017/0325072 | A1* | 11/2017 | Ueki ........................ H04B 7/10 |
| 2017/0346538 | A1* | 11/2017 | Saito ..................... H04B 7/0695 |
| 2018/0288628 | A1* | 10/2018 | Ueki ........................ B25J 19/00 |

FOREIGN PATENT DOCUMENTS

| | | |
|---|---|---|
| JP | 2013-230534 A | 11/2013 |
| JP | 5366058 B2 | 12/2013 |
| JP | 2014-225764 A | 12/2014 |
| WO | 2014007057 A1 | 1/2014 |

OTHER PUBLICATIONS

Extended European search report (EESR) dated Feb. 23, 2018 in a counterpart European Patent application.
English translation of Written Opinion of PCT/JP2016/053022 dated Apr. 26, 2016 from the International Searching Authority.

* cited by examiner

FIG. 6

|  | Driving content | Driving directivity information |
|---|---|---|
| Driving Pattern 1 | robot 3a: operation A1<br>robot 3b: operation B1<br>motor: stop | S1 |
| Driving Pattern 2 | robot 3a: operation A2<br>robot 3b: operation B2<br>motor: operation C2 | S2 |
| Driving Pattern 3 | robot 3a: stop<br>robot 3b: operation B3<br>motor: operation C3 | S3 |

WIRELESS POWER SUPPLY CONTROL SYSTEM AND METHOD FOR PRODUCING DIRECTIVITY INFORMATION

TECHNICAL FIELD

The present invention relates to a wireless power supply control system for controlling wireless power supply between a first radio having a directional antenna and a second radio that is driven by radio waves supplied therefrom, and the like.

RELATED ART

Focus is placed on wireless power supply with use of power of radio waves, as a method for supplying power to a portable electronic device, a movable electronic device, and the like. In this wireless power supply method, the need for connection between a power supply source and a power supply destination with a cable for supply power is eliminated, and thus convenience for a user increases. On the other hand, the longer the transmission distance is, the further the power of wireless radio waves decreases, and it is difficult to efficiently transmit power, and if high-power radio wave transmission is performed so as to compensate for the decrease, it is not possible to avoid influence on a peripheral electronic device or the like. In view of this, Patent Document 1 discloses a technique for transmitting power supply radio waves using a phased-array antenna. With this technique, efficient power supply is expected by a radio that transmits power supply radio waves and a radio that receives power supply radio waves while adjusting the phase of radio waves.

RELATED ART DOCUMENTS

Patent Documents

Patent Document 1: JP 2013-538548A
Patent Document 2: Japanese Patent No. 5366058

SUMMARY OF THE INVENTION

Problem to be Solved by the Invention

In recent years, in the field of FA (factory automation) as well, there is an increasing tendency for wireless communication to be used for the transfer of a control signal to a driving device by a control apparatus or the transfer of measurement data measured by various sensors to a control apparatus for collection, for example. Conventionally, cable communication has been widely used for these signals and data in consideration of the stability of communication. However, if cable communication is used, there is a significant limitation on the design of the manufacturing line. In view of this, it is thought that utilizing wireless communication not only increases the degree of freedom of the design of the manufacturing line but also increases the maintainability of the manufacturing line and a manufacturing apparatus due to elimination of a transfer cable.

When wireless communication needs to be utilized to the maximum in this manner, it is preferable that power for driving a driving device, a sensor, or the like is supplied wirelessly. Note that although wireless communication is suitably utilized due to an in-built battery such as an electric cell, the storage capacity of a battery is limited, and thus any restriction on maintenance may arise. However, when wireless power supply is performed with power supply radio waves, transmission and reception of the power supply radio waves tend to be influenced by external disturbance, in particular, influenced by fading due to the influence of an active object that is present between radios that transmit and receive power supply radio waves. In the field of FA, the space between radios varies due to a driving device such as an arm of a manufacturing robot being driven in the space in which wireless power supply is performed between radios, or the radio being disposed on a moving object, and an environment in which fading tends to occur is formed due to various objects going in and out the space. In such an environment in which fading tends to occur, it is preferable to use a communication antenna having directivity such as a phased-array antenna for stable wireless power supply, but even if such an antenna is utilized, it is difficult to realize suitable wireless power supply due to the influence of fading caused by the behaviour of an object in the space between radios.

The present invention was made to solve such problems, and an object of the present invention is to provide technology for suppressing the influence of fading between radios as much as possible while utilizing a directional antenna in a wireless power supply control system in the FA field and the like, and suitably performing wireless power supply between radios.

Means for Solving the Problems

In order to resolve the above-described issues, the present invention focused on the fact that control of the driving of one or more driving devices by a control apparatus tends to follow a plurality of predetermined driving patterns in the FA field. That is, the inventor of the invention thought that if the pattern for controlling the driving of the driving device that causes fading is determined in advance, the situation in which such fading occurs can be also understood to some extent in advance, and it is possible to perform stable wireless power supply between radios by controlling the directivity of the directional antenna in accordance with the situation.

Specifically, the present invention includes a control apparatus that controls driving of one or more driving devices in accordance with a plurality of predetermined driving patterns, a first radio that has a directional antenna and is formed to be capable of performing predetermined wireless power supply via the directional antenna, a second radio formed to be capable of receiving power supply radio waves for the predetermined wireless power supply and being driven by power of the power supply radio waves, the power supply radio waves being transmitted from the first radio, a directivity information storage unit that stores driving directivity information relating to a directivity, the driving directivity information being applied to the directional antenna of the first radio in relation to the predetermined wireless power supply from the first radio to the second radio in accordance with the plurality of driving patterns in a state in which driving of the one or more driving devices is controlled by the control apparatus in accordance with the plurality of driving patterns, an acquisition unit that acquires, from the control apparatus, a target driving pattern that is the driving pattern among the plurality of driving patterns that the control apparatus applies to the one or more driving devices, and an execution unit that selects, from among pieces of the driving directivity information stored in the directivity information storage unit, target driving directivity information corresponding to the target driving pattern acquired by the acquisition unit, applies the selected target driving directivity information to the directional antenna of the first radio, and executes the predetermined wireless power supply from the first radio to the second radio.

The wireless power supply control system according to the present invention is a system for performing control relating to wireless power supply between the first radio having a directional antenna and a second radio that is driven by power supply radio waves transmitted from the first radio. An antenna that can control various directivities according to a conventional technique can be adopted as the directional antenna, and for example, a phased-array antenna is an example of the directional antenna. In such a directional antenna, the intensity of radio wave emission and the sensitivity of radio wave reception increase in a specific direction, but it is difficult to perform suitable wireless transfer in directions other than the specific direction, compared to an omnidirectional antenna. In view of this, in order to realize suitable wireless power supply from the first radio to the second radio, the directivity of a directional antenna of the first radio is controlled.

A control apparatus that is electrically connected to the first radio is an apparatus that controls driving of one or more driving devices, and the driving control is performed in accordance with a plurality of pre-set driving patterns. Thus, if the control apparatus controls the driving of a driving device with use of the driving patterns, the first radio and the second radio perform wireless power supply in an environment in which the driving of this driving device is controlled in accordance with these driving patterns. As a result, fading caused by the driving patterns acts on the wireless power supply from the first radio to the second radio.

Here, the plurality of driving patterns for the control apparatus utilizing the driving device are determined in advance, and thus it is thought that fading caused by the driving patterns has reproducibility to some extent. Thus, it is thought that the effect of the fading on the wireless power supply from the first radio to the second radio also significantly depends on the driving pattern executed by the control apparatus. In view of this, a directivity information storage unit stores, in accordance with driving patterns, driving directivity information that can be applied to a directional antenna and is set in consideration of fading caused by a driving pattern in a state in which the driving of the driving device is controlled by the control apparatus in accordance with the driving patterns (hereinafter, also referred to as "pattern driving control state"), the driving directivity information making it possible to perform suitable wireless power supply from the first radio to the second radio.

That is, focus is placed on the fact that the content of controlling driving of a driving device by a control apparatus follows a predetermined driving pattern, and the directivity information storage unit stores driving directivity information that is applied to the directional antenna corresponding to that driving pattern. In other words, this means that the directivity information storage unit stores, for each driving pattern, driving directivity information, which is information relating to the directivity for suitably performing wireless power supply from the first radio to the second radio, as long as the control apparatus controls the driving of the driving device in accordance with the driving patterns. This driving directivity information can be obtained by preliminarily experimentally controlling the driving of a driving device in accordance with a driving pattern when this driving pattern is determined.

In view of this, the acquisition unit acquires a target driving pattern, which is the driving pattern performed at that point in time in the pattern driving control state. The execution unit selects, from among pieces of the driving directivity information stored in the directivity information storage unit, target driving directivity information, which is driving directivity information corresponding to the target driving pattern, and applies the selected driving directivity information to wireless power supply from the first radio to the second radio in that pattern driving control state. As a result, the influence of fading occurring in this pattern driving control state on wireless power supply between radios can be suppressed as much as possible, and accordingly suitable wireless power supply can be realized.

Note that the driving directivity information stored in the directivity information storage unit needs only be applied to the directional antenna at least in the case where power supply radio waves are transmitted from the first radio to the second radio. Therefore, in the case where a signal other than power supply radio waves is transmitted from the first radio to the second radio, the driving directivity information may be applied to the directional antenna, and the second radio that has received wireless power supply with power supply radio waves transmits any signal to the first radio, in order to receive the signal, the driving directivity information may be applied to the directional antenna. As such an example of applying the driving directivity information, in the above-described wireless power supply system, the first radio may be formed to transmit a predetermined control signal to the second radio together with the power supply radio waves, and the second radio may be formed to transmit a signal relating to a control result based on the power supply radio waves transmitted from the first radio and the predetermined control signal. Moreover, in this case, the same target driving directivity information may be applied to the directional antenna at the time of transmitting the power supply radio waves and the predetermined control signal and at the time of receiving a signal relating to the control result. Such an application mode is useful for the case where fading acting on wireless communication between radios is considered to be the same regardless of the wireless communication directions.

Here, in the above-described wireless power supply control system, the acquisition unit may acquire, in addition to the target driving pattern, information relating to an execution time at which the target driving pattern is executed in the one or more driving devices by the control apparatus, and the execution unit may execute the predetermined wireless power supply based on the execution time via the directional antenna of the first radio to which the target driving directivity information is applied. As a result of the acquisition unit further acquiring information relating to execution time in this manner, in wireless communication performed by the execution unit with the second radio via the first radio to which the target driving directivity information is applied, wireless power supply is performed after appropriately applying directivity information required for suitable wireless power supply to the directional antenna, and thus an increase in wireless power supply efficiency is achieved.

Also, in the above-described wireless power supply control system, the target driving directivity information may be information relating to a directivity that is applied to the directional antenna of the first radio, the directivity being set such that a received signal received by the second radio has a maximum intensity or is in a predetermined received signal intensity range at a plurality of control times that are set in an execution period during which the target driving pattern is executed. Note that this predetermined received signal intensity range refers to a range of the received signal intensity required to realize suitable wireless power supply from the first radio to the second radio. Thus, by setting the target driving directivity information in this manner, wireless power supply from the first radio to the second radio using the directional antenna to which the target driving directivity information is applied by the execution unit can be executed efficiently.

Also, in the above-described wireless power supply control system, the second radio may be disposed on the driving device whose driving is controlled by the control apparatus, and a relative position of the second radio with respect to the first radio may change due to the driving device being moved in accordance with the target driving pattern. In this case, the target driving directivity information is produced in a situation in which the relative positions of the second radio and the first radio change. In this manner, the second radio is the driving device whose driving is controlled by the control apparatus, that is, in a mode in which the second radio is disposed on the driving device whose driving is controlled in accordance with a driving pattern, the space between the first radio and the second radio tends to vary depending on the driving pattern and wireless power supply between the two radios tends to be influenced by fading. On the other hand, the degree of freedom of system design can be increased by disposing the second radio that obtains driving power through wireless power supply, on the driving device whose driving is controlled in this manner. Therefore, it is possible to suitably apply the invention of this application to this mode.

Meanwhile, the invention of this application does not exclude a mode in which the positions of the first radio and the second radio do not change relative to each other in the above-described wireless power supply control system. Even in the mode in which radios do not move in this manner, fading sometimes acts on wireless power supply between radios due to the driving of a driving device being controlled in accordance with a driving pattern near the radios, and thus the invention of this application can be suitably applied thereto.

Also, the above-described wireless power supply control system may include a plurality of the second radios. If a plurality of second radios are included in this manner, the following two aspects are examples of the wireless power supply control system according to the present invention. As a first aspect, the plurality of second radios are each configured to be capable of alternatively performing the predetermined wireless power supply to the first radio. Also, the directivity information storage unit stores the driving directivity information that corresponds to the second radios and is applied to the directional antenna of the first radio in relation to the predetermined wireless power supply from the first radio to the plurality of second radios in accordance with the plurality of driving patterns in a state in which driving of the one or more driving devices is controlled by the control apparatus in accordance with the plurality of driving patterns. Moreover, the execution unit selects, from among pieces of the driving directivity information stored in the directivity information storage unit, target driving directivity information that corresponds to the target driving pattern acquired by the acquisition unit and corresponds to the plurality of second radios, and executes the predetermined wireless power supply from the first radio to the plurality of second radios in accordance with the selected target driving directivity information. That is, in this first aspect, when the first radio wirelessly supplies power to the plurality of second radios, the target driving directivity information is applied to the directional antenna in accordance with the corresponding wireless power supply. Accordingly, wireless power supply to the second radios can be made suitable.

Next, as a second aspect, a second radio group including the plurality of second radios is configured to be capable of performing the predetermined wireless power supply with respect to the first radio. Also, the directivity information storage unit stores the driving directivity information that corresponds to the second radio group and is applied to the directional antenna of the first radio in relation to the predetermined wireless power supply from the first radio to the second radio group in accordance with the plurality of driving patterns in a state in which driving of the one or more driving devices is controlled by the control apparatus in accordance with the plurality of driving patterns. Moreover, the execution unit selects, from among pieces of the driving directivity information stored in the directivity information storage unit, target driving directivity information that corresponds to the target driving pattern acquired by the acquisition unit and corresponds to the second radio group, and executes the predetermined wireless power supply from the first radio to the second radio group in accordance with the selected target driving directivity information. Note that in the predetermined wireless power supply to the second radio group, the first radio may alternatively wirelessly supply power to the second radios, or may wirelessly supply power to the plurality of second radios simultaneously. In this second aspect, when the first radio wirelessly supplies power to the second radio group constituted by the plurality of second radios, the target driving directivity information is applied to the directional antenna in accordance with the wireless power supply to the second radio group. That is, in the wireless power supply to the second radio group, the target driving directivity information that is applied to the directional antenna serves as shared directivity information. Therefore, when the first radio wirelessly supplies power to the plurality of second radios, it is not necessary to modify the directivity information that is applied in accordance with the wireless power supply to each of the second radios, and it is possible to achieve suitable wireless power supply to the second radios with simple control.

Here, in the above-described wireless power supply control system, the second radio may be a sensor-equipped radio including a sensor that is driven by power of the power supply radio waves so as to measure a predetermined environmental parameter. In this case, the invention of this application can efficiently wirelessly supply power for driving the second radio and the sensor from the first radio.

Also, the present invention has an aspect of a wireless power supply control apparatus. That is, the present invention is a wireless power supply control apparatus that controls predetermined wireless power supply performed by a first radio configured to be capable of performing the predetermined wireless power supply to a second radio via a directional antenna in a predetermined environment in which driving of one or more driving devices is controlled by a control apparatus in accordance with a plurality of predetermined driving patterns, the second radio being formed to be capable of receiving power supply radio waves for the predetermined wireless power supply and being driven by power of the power supply radio waves, the power supply radio waves being transmitted from the first radio. The wireless power supply control apparatus includes a directivity information storage unit that stores driving directivity information relating to a directivity, the driving directivity information being applied to the directional antenna of the first radio in relation to the predetermined wireless power supply from the first radio to the second radio in accordance with the plurality of driving patterns in a state in which driving of the one or more driving devices is controlled by the control apparatus in accordance with the plurality of driving patterns, an acquisition unit that acquires, from the control apparatus, a target driving pattern that is the driving pattern among the plurality of driving patterns that the control apparatus applies to the one or more driving devices, and an execution unit that selects, from among pieces of the driving directivity information stored in the directivity information storage unit, target driving directivity information corresponding to the target driving pattern acquired by the acquisition unit, applies the selected target driving directivity information to the directional antenna of the first radio, and executes the predetermined wireless power supply from the first radio to the second radio. Accordingly, it is possible to suppress the influence of fading between radios as much as possible and suitably perform wireless power supply to the second radio. Note that the technical idea of the invention of this application disclosed in relation to the above-described wireless power supply control system can also be applied to the wireless power supply control apparatus as long as no technical discrepancy arises. Also, a configuration may be adopted in which the above-described wireless power supply control apparatus is included in the first radio.

Here, the present invention also has an aspect of a method for controlling wireless power supply. That is, the present invention is a wireless power supply control method for controlling predetermined wireless power supply performed by a first radio configured to be capable of performing the predetermined wireless power supply to a second radio via a directional antenna in a predetermined environment in which driving of one or more driving devices is controlled by a control apparatus in accordance with a plurality of predetermined driving patterns, the second radio being formed to be capable of receiving power supply radio waves for the predetermined wireless power supply and being driven by power of the power supply radio waves, the power supply radio waves being transmitted from the first radio. Moreover, the wireless power supply control method includes an acquisition step of acquiring, from the control apparatus, a target driving pattern that is a driving pattern among the plurality of driving patterns that the control apparatus applies to the one or more driving devices, a selection step of selecting, from among pieces of driving directivity information relating to a directivity, target driving directivity information corresponding to the target driving pattern acquired in the acquisition step, the target driving directivity information being applied to the directional antenna of the first radio in relation to the predetermined wireless power supply from the first radio to the second radio in accordance with the plurality of driving patterns in a state in which driving of the one or more driving devices is controlled by the control apparatus in accordance with the plurality of driving patterns, and an execution step of applying the target driving directivity information selected in the selection step to the directional antenna of the first radio and executing the predetermined wireless power supply from the first radio to the second radio. Accordingly, it is possible to suppress the influence of fading between radios as much as possible and suitably perform wireless power supply to the second radio. Note that the technical idea of the invention of this application disclosed in relation to the above-described wireless power supply control system can also be applied to the wireless power supply control method as long as no technical discrepancy arises.

Furthermore, the invention of this application also has an aspect of a method for producing directivity information. That is, the present invention is a directivity information production method for producing directivity information that is applied to a directional antenna in predetermined wireless power supply control performed by a first radio configured to be capable of performing the predetermined wireless power supply to a second radio via the directional antenna in a predetermined environment in which driving of one or more driving devices is controlled by a control apparatus in accordance with a plurality of predetermined driving patterns, the second radio being formed to be capable of receiving power supply radio waves for the predetermined wireless power supply and being driven by power of the power supply radio waves, the power supply radio waves being transmitted from the first radio. Moreover, the directivity information production method includes a test radio wave transmission step of transmitting test radio waves at a plurality of control times that are set in an execution period during which a driving pattern is executed, from the first radio to the second radio, in a state in which driving of the one or more driving devices is controlled by the control apparatus in accordance with the plurality of driving patterns, a received signal intensity measurement step of measuring a received signal intensity for the test radio waves when the second radio receives the test radio waves transmitted from the first radio in the test radio wave transmission step, and a production step of producing driving directivity information relating to a directivity in accordance with the plurality of driving patterns, the driving directivity information being applied to the directional antenna of the first radio in relation to the predetermined wireless power supply from the first radio to the second radio in a state in which driving of the one or more driving devices is controlled by the control apparatus in accordance with the plurality of driving patterns such that a received signal measured at the plurality of control times in the received signal intensity measurement step has a maximum intensity or is in a predetermined received signal intensity range. Accordingly, it is possible to suppress the influence of fading between radios as much as possible and produce directivity information for achieving suitable wireless power supply to the second radio.

Effects of the Invention

In a wireless power supply control system, it is possible to provide technology for suppressing the influence of fading between radios as much as possible while utilizing a directional antenna, and suitably performing wireless power supply between radios.

BRIEF DESCRIPTION OF THE DRAWINGS

FIG. 6 is a diagram showing a schematic structure of a database relating to directivity information provided in the radio 1 included in the wireless power supply control system shown in FIG. 1.

EMBODIMENTS OF THE INVENTION

A wireless power supply control system (hereinafter, also simply referred to as "system" in some cases) 100 according to the present invention, as well as a radio 1 and radios 2a and 2b included in this system will be described with reference to the drawings. Note that the configuration of the following embodiment is merely an example, and the present invention is not limited to the configuration of this embodiment.

Figure 1:
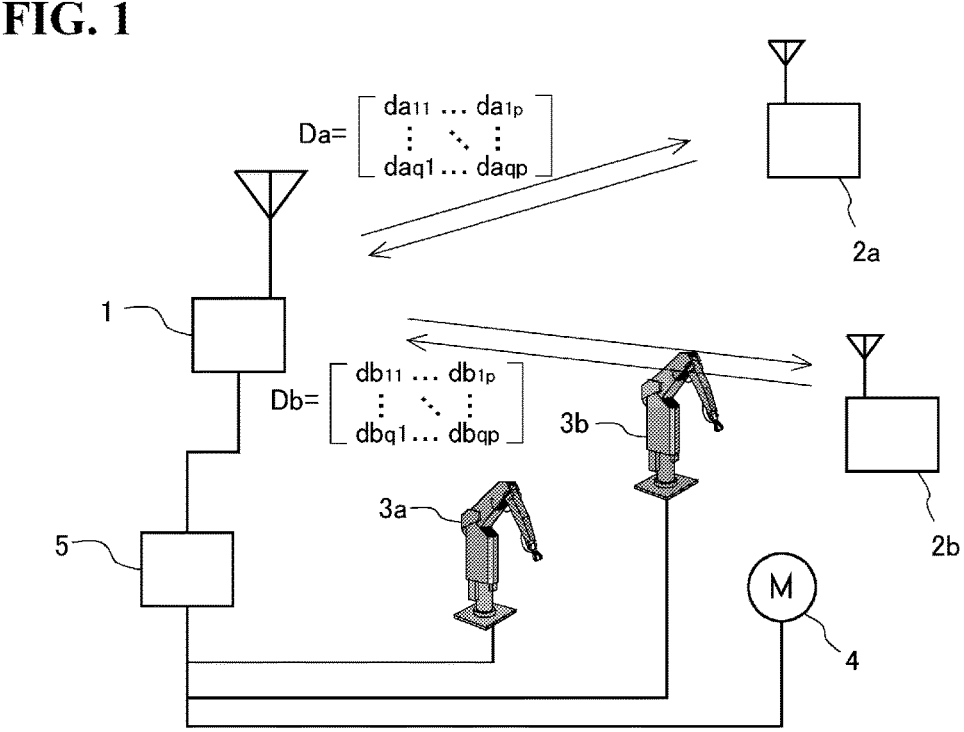
FIG. 1 is a diagram showing a schematic configuration of a wireless power supply control system according to the present invention.

FIG. 1 is a diagram showing a schematic configuration of the system 100 used in the field of FA (factory automation) in a factory or the like, and the arrangement of robots 3a and 3b and a motor 4 whose driving is controlled by a control apparatus 5 included therein. Specifically, the system 100 includes the control apparatus 5 such as a PLC (programmable logic controller), and the driving of the robots 3a and 3b and the motor 4 is controlled by this control apparatus 5 in accordance with a predetermined driving pattern. Note that control of the driving of the robot 3a and the like by the control apparatus 5 is conventional technology, and is not central to the invention of this application, and thus specific description thereof is omitted.

Here, the radio 1 is electrically connected to the control apparatus 5 with a cable. Note that connection between the control apparatus 5 and the radio 1 may be realized wirelessly. The radio 1 has a phased-array antenna, which is a directional antenna. The phased-array antenna is an antenna according to a conventional technique, and briefly speaking, it has a directivity control function that can change the direction of transmitting radio waves or conversely increase the sensitivity of reception of radio waves in a specific direction by slightly changing the phase of a signal that is applied to the antenna elements of the antenna array. Therefore, the phased-array antenna of the radio 1 is an antenna that can more sensitively execute the transmission of radio waves in a specific direction and the reception of radio waves in a specific direction compared to other directions, and that can arbitrarily control this specific direction. In the invention of this application, control in this specific direction in the phased-array antenna is referred to as "directivity control in the phased-array antenna"

By controlling the directivity of the phased-array antenna in this manner, the radio 1 having the phased-array antenna can efficiently deliver radio waves to a partner radio that performs wireless communication in a factory in which the system 100 is disposed, and can efficiently receive radio waves from the partner radio. In this working example, a radio 2a and a radio 2b are disposed in the system 100 as the radios that serve as the partners of the radio 1. The radio 2a and the radio 2b are disposed at different positions, and each have a rectenna system in which electromagnetic energy of microwaves is subjected to rectification conversion to direct current. Unlike the above-described phased-array antenna, the antenna in this rectenna system to which the radio 2a and the radio 2b are connected is not necessarily an antenna having a directivity. Moreover, in the radio 2a and the radio 2b, power for driving the radio 2a and the radio 2b, and the power for driving their accompanying elements (for example, a later-described sensor or the like) are provided by wireless power supply via power supply radio waves from the radio 1 via this rectenna system. Thus, when the radio 2a and the radio 2b receive wireless power supply from the above-described radio 1, wireless power supply can be performed efficiently due to independent control of the directivity of the phased-array antenna of the radio 1 in wireless power supply to the radio 2a and wireless power supply to the radio 2b. Note that in FIG. 1, the directivity of the phased-array antenna is represented by Da in the case where the radio 1 wirelessly supplies power to the radio 2a, the directivity of the phased-array antenna in the case where the radio 1 wirelessly supplies power to the radio 2b is represented by Db, and the phased-array antenna can modify the directivity with respect to any two-dimensional direction.

Also, the radios 2a and 2b are each provided with a sensor for measuring outside environment parameters (temperature, humidity, acceleration, and the like). Moreover, power for driving the provided sensor is provided by power supply radio waves from the radio 1 as described above. Information measured by this sensor (measurement information) is transmitted from the radios 2a and 2b to the radio 1, and driving power for this transmission is also provided by power supply radio waves from the radio 1. Note that the measurement information transmitted to the radio 1 is collected therein, and is subjected to predetermined processing in the control apparatus 5. Here, examples of the sensors provided in the radios 2a and 2b include physical system sensors such as a magnetic sensor, a photoelectronic sensor, a temperature sensor, a humidity sensor, an illuminance sensor, a flow sensor, a pressure sensor, a ground temperature sensor, and a particle sensor, and chemical system sensors such as a $CO_2$ sensor, a pH sensor, an EC sensor, and a soil moisture sensor. In the present embodiment, in order to simplify the description, it is assumed that the radios 2a and 2b are provided with only a temperature sensor for measuring the external temperature at positions at which the radios 2a and 2b are disposed.

In the system 100 having such a configuration, in a state in which the driving of the robots 3a and 3b and the motor 4 is controlled by the control apparatus 5 in accordance with a predetermined driving pattern in order to manufacture a product in the factory (hereinafter, also referred to as "pattern driving control state"), information on the temperature measured by the temperature sensors at the positions at which the radios 2a and 2b are installed is transferred to the radio 1 through wireless communication. However, the radios 2a and 2b rely on power supply radio waves supplied from the radio 1 as their driving power, and thus a measurement instruction signal is transmitted from the radio 1 to the radios 2a and 2b together with power supply radio waves, and temperature is measured by the sensors of the radios 2a and 2b and measurement and transmission of temperature are performed in response thereto. That is, the radios 2a and 2b are each configured to execute these processes, triggered by wireless power supply from the radio 1 without performing processing relating to the measurement and transmission based on their determination. Such a configuration is equivalent to a passive-type information transfer configuration provided in a known RFID (Radio Frequency Identifier) or the like, and thus the detailed description thereof is omitted. Also, as another method, the radios 2a and 2b may be equivalent to a semi-passive type information transfer configuration. In this case, the radios 2a and 2b can independently measure temperature at predetermined times, and temporarily store the measurement information in their memories. Moreover, the radio 1 transmits a request signal as needed so as to make a request for transmitting measurement information stored in the memories of the radios 2a and 2b to the radio 1.

Also, in the present embodiment, it is assumed that the control apparatus 5 applies the following three driving patterns to the robots 3a and 3b and the motor 4 as predetermined driving patterns. For example, as Driving Pattern 1, the robot 3a is caused to execute a welding operation A1 and the robot 3b is caused to execute a welding operation B1 in a state in which the motor 4 is stopped. Furthermore, as Driving Pattern 2, the robot 3a is caused to execute an operation A2, the robot 3b is caused to execute an operation B2, and the motor 4 is caused to execute an operation C2. Moreover, as Driving Pattern 3, the robot 3b is caused to execute a welding operation B3 and the motor 4 is caused to execute an operation C3 in a state in which the robot 3a is stopped. Note that the types of driving pattern are also disclosed in FIG. 6 that will be described later.

Here, wireless power supply between the radio 1 and the radios 2a and 2b can be performed relatively stably due to the directivity of the phased-array antenna of the radio 1 in particular. Thus, it is expected to be able to efficiently supply power to the radios 2a and 2b and efficiently transfer the information on the temperature measured by the radios 2a and 2b to the radio 1. On the other hand, in the system 100 placed in the FA environment, the robots 3a and 3b move their arms and the like in accordance with a control instruction given by the control apparatus 5, and the driving of the motor 4 moves an object that is to be driven (for example, a table of a machine tool). Here, bodies of robots 3a and the like and objects to be driven by the motor 4 are made of metal in many cases. If an object having such a metal body moves in the space in which the system 100 is disposed, there is a risk that fading will act on wireless power supply from the radio 1 to the radios 2a and 2b, and inhibit stable wireless power supply. Even if the radio 1 performs wireless power supply utilizing the phased-array antenna, there is a risk that fading caused by the driving of the robot 3a and the like will act on the wireless power supply, whereas if fading acts on wireless power supply due to the set directivity of the phased-array antenna, there is a possibility that the assumed effect of the directivity cannot be sufficiently enjoyed and the efficiency of wireless power supply will decrease significantly.

Figure 2:
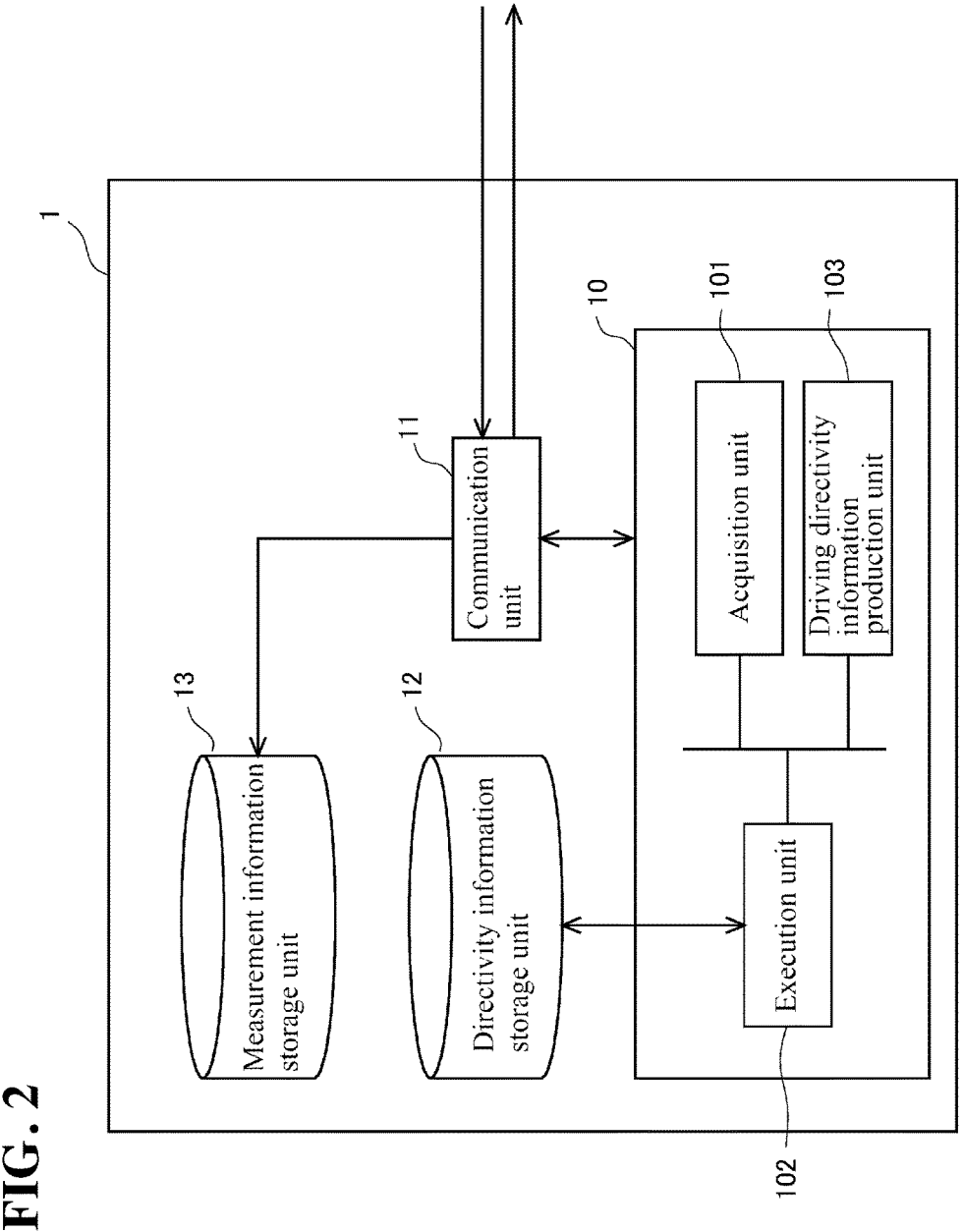
FIG. 2 is a functional block diagram of a radio 1 included in the wireless power supply control system shown in FIG. 1.
Figure 3:
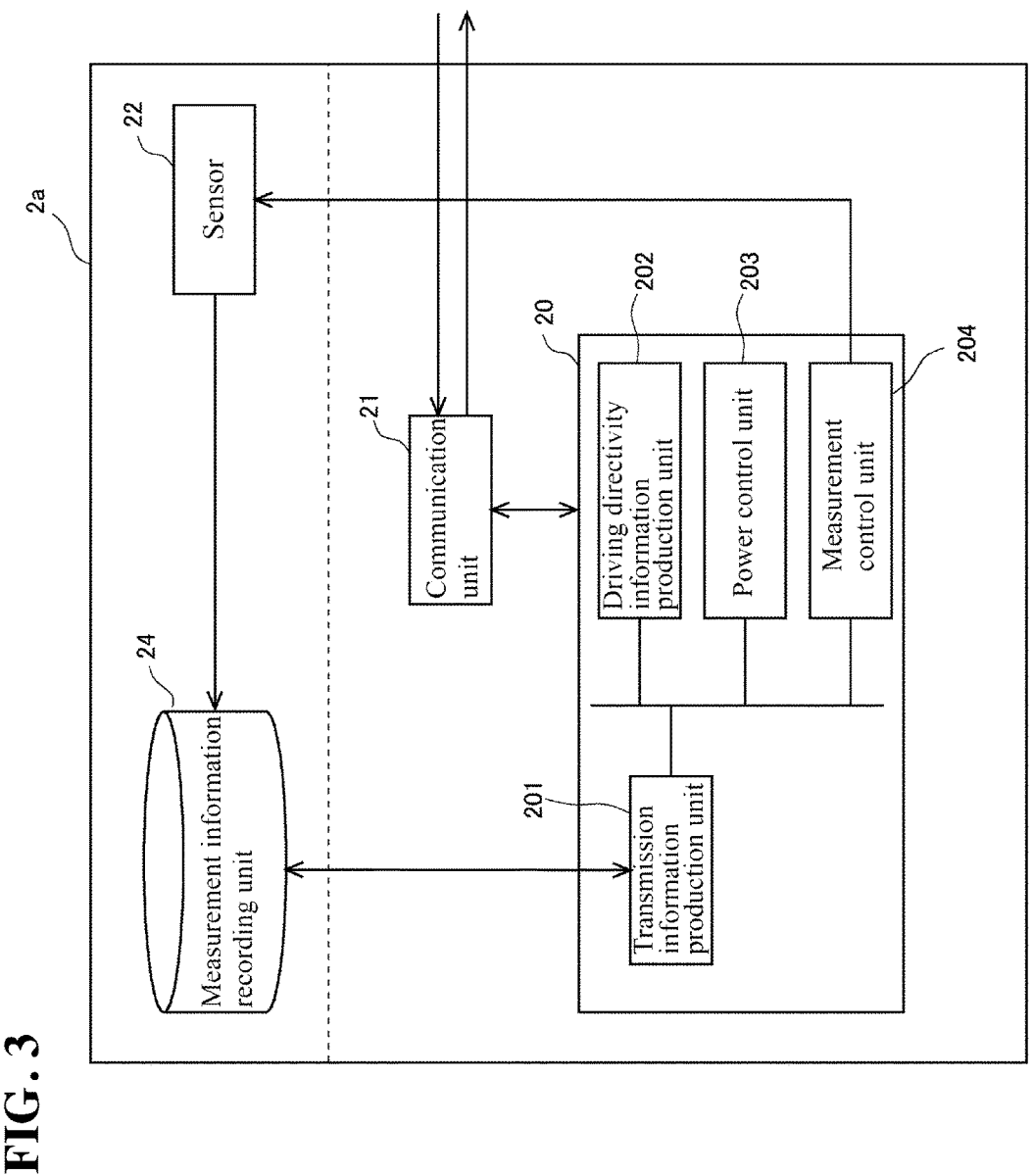
FIG. 3 is a functional block diagram of a radio 2a included in the wireless power supply control system shown in FIG. 1.

In view of this, in order to suppress a decrease in the efficiency of wireless power supply between radios due to fading as much as possible, the system 100 according to the invention of this application adopts a configuration in which the directivity of the phased-array antenna of the radio 1 is controlled in accordance with the driving of the robot 3a and the like being controlled by the control apparatus 5, which is the cause of fading. Specifically, the radio 1 and the radios 2a and 2b are configured as shown in FIGS. 2 and 3. The radio 1 and the radios 2a and 2b internally have arithmetic units, memories, and the like, and exhibit not only the wireless communication function but also various functions due to a predetermined control program being executed by these arithmetic units. FIGS. 2 and 3 are functional block diagrams showing an illustration of the functions of the radio 1 and radios 2a and 2b. Note that the radio 2a and the radio 2b have basically the same functions, and thus in this embodiment, FIG. 3 shows a functional block diagram of the radio 2a as a representative example.

First, the radio 1 has a control unit 10, a communication unit 11, a directivity information storage unit 12, and a measurement information storage unit 13 as functional units. Hereinafter, functional units of the radio 1 will be described. The control unit 10 is a functional unit that performs various control in the radio 1, and in particular, has an acquisition unit 101, an execution unit 102, and a driving directivity information production unit 103. The acquisition unit 101 is a functional unit that acquires information relating to the driving pattern that the control apparatus 5 applies to the robot 3a and the like from the control apparatus 5 that is electrically connected to the radio 1. In the present embodiment, as described above, the driving of the robot 3a and the like is controlled in accordance with the three predetermined driving patterns Driving Patterns 1 to 3, and the corresponding pattern driving control states are formed. Note that in addition to the driving pattern, the acquisition unit 101 also acquires information relating to the execution time at which the driving pattern is executed by the control apparatus 5. Examples of the information relating to this execution time include information on the start time at which the execution of the driving pattern is started by the control apparatus 5 and the like.

Also, the execution unit 102 is a functional unit that selects, from the later-described directivity information storage unit 12, driving directivity information that is applied to the phased-array antenna based on the driving pattern acquired by the acquisition unit 101, and handles, from the radio 1 to the radio 2a or the like, transmission of power supply radio waves for wireless power supply, and transmission of a measurement instruction signal for measuring temperature in the radio 2a or the like, after controlling the directivity of this phased-array antenna based on the selected driving directivity information. Furthermore, the execution unit 102 is also a functional unit that receives, from the radio 2a or the like, information on the temperature measured in accordance with the measurement instruction signal after similarly controlling the directivity of the phased-array antenna. The driving directivity information is information relating to the directivity set to the phased-array antenna of the radio 1 when the robot 3a and the like is in the pattern driving control state, and determines the directivity of the phased-array antenna so as to suitably realize wireless power supply from the radio 1 to the radio 2a or the like even at the time of execution of the driving patterns. Thus, if the acquired driving pattern changes, the execution unit 102 changes the driving directivity information applied to the phased-array antenna in principle. Furthermore, the driving directivity information production unit 103 is a functional unit that produces the driving directivity information that is stored in the directivity information storage unit 12 and used by the execution unit 102, together with the radio 2a and the like, which are the wireless power supply destinations. A specific mode of producing this directivity information will be described later.

Also, the communication unit 11 is a functional unit that communicates with a device external to the radio 1, that is, transmits and receives information to/from the external device. Specifically, the communication unit 11 is formed so as to interact with the control unit 10. As a result, the communication unit 11 handles reception of information relating to the driving pattern by the acquisition unit 101, wireless power supply to the radio 2a or the like to which the driving directivity information selected by the execution unit 102 is applied, and wireless communication with the radio 2a or the like at the time of information production performed by the driving directivity information production unit 103. The directivity information storage unit 12 is a functional unit that stores the driving directivity information applied to the phased-array antenna in the pattern driving control state in the memory, and the measurement information storage unit 13 is a functional unit that stores temperature information in the memory after the communication unit 11 receives the information that was measured by the radio 2a or the like that has received wireless power supply in accordance with the measurement instruction signal and transferred therefrom. At the time of receiving this temperature information, the driving directivity information stored in the directivity information storage unit 12 is applied to the phased-array antenna.

Next, the functional units of the radio 2a will be described with reference to FIG. 3. The radio 2a has, as functional units, a control unit 20, a communication unit 21, and a measurement information recording unit 24, and in the case of the present embodiment, the radio 2a is provided with a sensor 22 for measuring a temperature. Hereinafter, functional units of the radio 2a will be described. The control unit 20 is a functional unit that handles various control in the radio 2a, and in particular, has a transmission information production unit 201, a directivity information production unit 202, a power control unit 203, and a measurement control unit 204. This transmission information production unit 201 is a functional unit that produces transmission information including the information on the temperature measured by the sensor 2a. Also, the driving directivity information production unit 202 is a functional unit that produces driving directivity information utilized by the execution unit 102 in the radio 1 together with the radio 1.

Also, the power control unit 203 is a functional unit that controls distribution of power in order to utilize the power obtained by passing power supply radio waves transmitted from the radio 1 through the rectenna system for driving of the radio 2a, driving of the sensor 22, and the like. The radio 2a and the like are not provided with a secondary battery that stores power, such as a battery or a capacitor, and thus the power distributed by this power control unit 203 is a source for processing performed in the radio 2a and the like. Instead of such a mode, a configuration may be adopted in which the radio 2a and the like are provided with a secondary battery, and store part of the power or the entire power obtained from power supply radio waves. In this case, the radio 2a and the sensor 22 are driven by the power stored in the secondary battery. In any case, the power control unit 203 is a functional unit for using the electric energy of power supply radio waves supplied from the radio 1 in the radio 2a and the like.

Next, the measurement control unit 204 is a functional unit that starts up the sensor 22 in response to the instruction given by the radio 1 and executes measurement of temperature information when power required to drive a sensor is distributed by the power control unit 203. Also, as another mode, the measurement control unit 204 may be configured to start up the sensor 22 at times that are independently designated in advance, and measure temperature information. Accordingly, the information on the measured temperature is sometimes stored in the memory by the measurement information recording unit 24. This measurement information recording unit 24 is formed so as to interact with the control unit 20, and the recorded measurement information is passed to the control unit 20 in accordance with the instruction given by the control unit 20, and transmission information is produced by the transmission information production unit 201. Also, the communication unit 21 is formed so as to interact with the control unit 20. As a result, the communication unit 21 handles reception of power supply radio waves from the radio 1, transmission of transmission information produced by the transmission information production unit 201, and wireless communication with the radio 1 at the time of information production by the driving directivity information production unit 202, and the like.

Driving Directivity Information Production Processing

The following describes processing that realizes efficient wireless power supply from the radio 1 to the radio 2a that is not easily influenced by fading in the radio 1 and the radio 2a having such configurations. When power is wirelessly supplied from the radio 1 to the radio 2a, as described above, there is a possibility that the efficiency of wireless power supply will decrease due to the influence of fading caused due to the robot 3a or the like being driven by the control apparatus 5 in accordance with a predetermined driving pattern. Here, in the system 100 according to the invention of this application, focus was placed on the fact that in the driving control performed by the control apparatus 5 in accordance with a driving pattern, the driving of the robot 3a and the like is also controlled with predetermined operation content. It can be thought that the influence of fading that is caused due to such driving control performed in accordance with the driving pattern also approximately has reproducibility. In view of this, before the driving of the robot 3a and the like is actually controlled in order to manufacture a product in the factory, the robot 3a and the like are experimentally driven by the control apparatus 5 with the same operational content, and the influence of fading at that time on wireless power supply from the radio 1 to the radio 2a is measured. Considering this influence, the driving directivity information, which is the directivity information applied to the phased-array antenna corresponding to the driving pattern, is produced so as to achieve an efficient wireless power supply.

Figure 4:
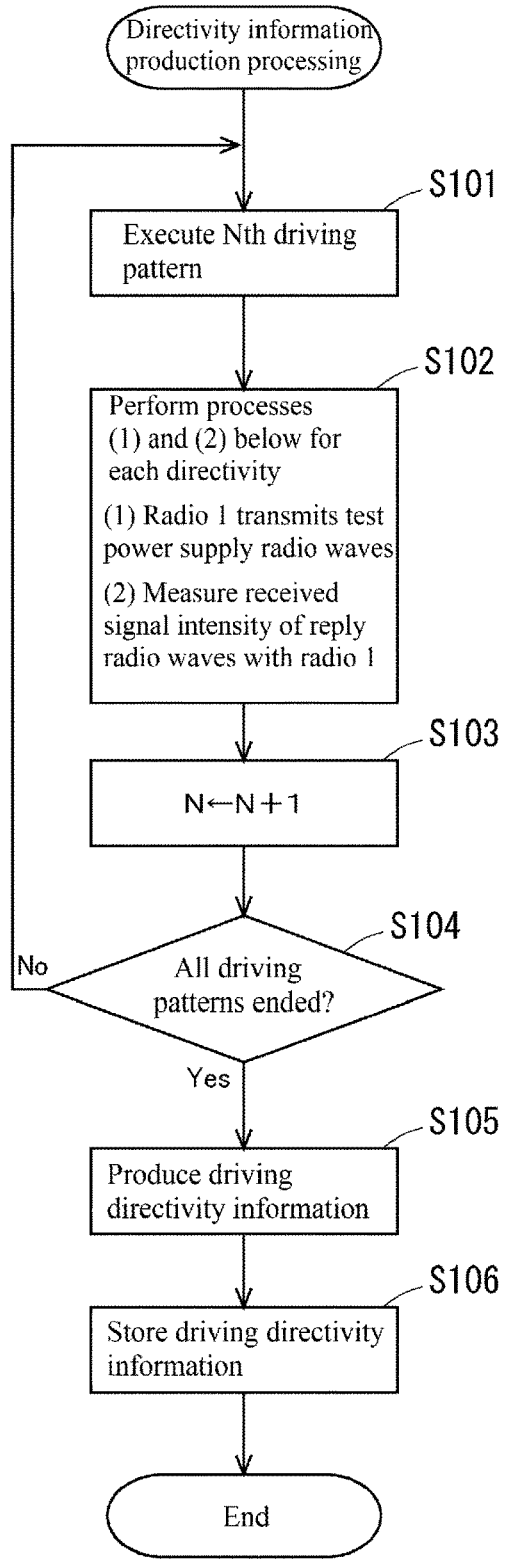
FIG. 4 is a flowchart of processing for producing directivity information, which is performed between the radio 1 and the radio 2a in the wireless power supply control system shown in FIG. 1.

The flow of processing for producing this driving directivity information is shown in the flowchart in FIG. 4. This directivity information production processing is executed through cooperation of the driving directivity information production unit 103 of the radio 1 and the driving directivity information production unit 202 of the radio 2a. Hereinafter, this directivity information production processing will be described. First, in step S101, in order to produce driving directivity information, the radio 1 requests the control apparatus 5 to successively execute a plurality of driving patterns (three driving patterns Driving Patterns 1 to 3 in the case of the present embodiment) that are executed on the robot 3a and the like. Accordingly, the control apparatus 5 controls the driving of the robot 3a and the like in accordance with the driving patterns in order starting from Driving Pattern 1, and wireless power supply from the radio 1 to the radio 2a is in the pattern driving control state in which the driving of the robot 3a and the like is controlled.

Next, in step S102, Process (1) and Process (2) below are performed between the radio 1 and the radio 2a, for each directivity that can be set in the phased-array antenna. First, on the radio 1 side, test radio waves are transmitted from the radio 1 to the radio 2a at a plurality of control times in the pattern driving control state relating to an Nth driving pattern (Process (1)). Here, as described later, the control time is the time for controlling the directivity of the phased-array antenna at the time of wireless power supply, and the shorter the interval of the control time is, the more carefully the directivity can be controlled. Note that this time interval is a sufficiently short interval with respect to a change in the directivity in the pattern driving control state, that is, an interval short enough to sufficiently understand the effect of fading caused by driving control corresponding to the driving pattern on the directivity.

On the other hand, on the radio 2a side, upon receiving test power supply radio waves transmitted from the radio 1, the radio 2a transmits reply radio waves to the radio 1 in response to the reception, and the radio 1 receives the reply radio waves. With regard to this reception of reply radio waves by the radio 1, the received signal intensity for reply radio waves is measured during a period of executing a driving pattern at this point in time, for each directivity that can be set in the phased-array antenna (Process (2)). The reason why the received signal intensity is measured in the radio 1 in this manner is that there are cases where it is difficult to measure the received signal intensity for radio waves in the radio 2a provided with the rectenna system. Because the received signal intensity for reply radio waves in the radio 1 and the received signal intensity for test power supply radio waves in the radio 2a has a strong correlation, the received signal intensity measured in the radio 1 can be regarded as the received signal intensity for test power supply radio waves measured in the radio 2a. Thus, if the directivity of the phased-array antenna can be set in pq ways, the radio 2a returns reply radio waves corresponding to the directivity of the pq ways to test power supply radio waves transmitted from the radio 1, and the radio 2a measures the received signal intensity for reply radio waves corresponding to the directivity of the pq ways. When transmission of test power supply radio waves and measurement of the received signal intensity for the corresponding reply radio waves end with all of the directivities, the processing of S102 ends, and the processing advances to step S103. Note that when the radio 2a can directly measure the received signal intensity for test power supply radio waves, a configuration may be adopted in which the received signal intensity for test power supply radio waves corresponding to the directivity transmitted from the radio 1 is measured and the measurement result is transmitted to the radio 1.

In step S103, N indicating which driving pattern is executed to produce the driving directivity information in step S101 is incremented. Then, in step S104, in order to produce the driving directivity information, it is determined whether or not the control of the driving of the robot 3a and the like that is performed by the control apparatus 5 in accordance with all of the driving patterns has ended. If an affirmative determination is made in step S104, the processing advances to step S105, whereas if a negative determination is made, the processing of step S101 onward is repeated again.

Figure 5:
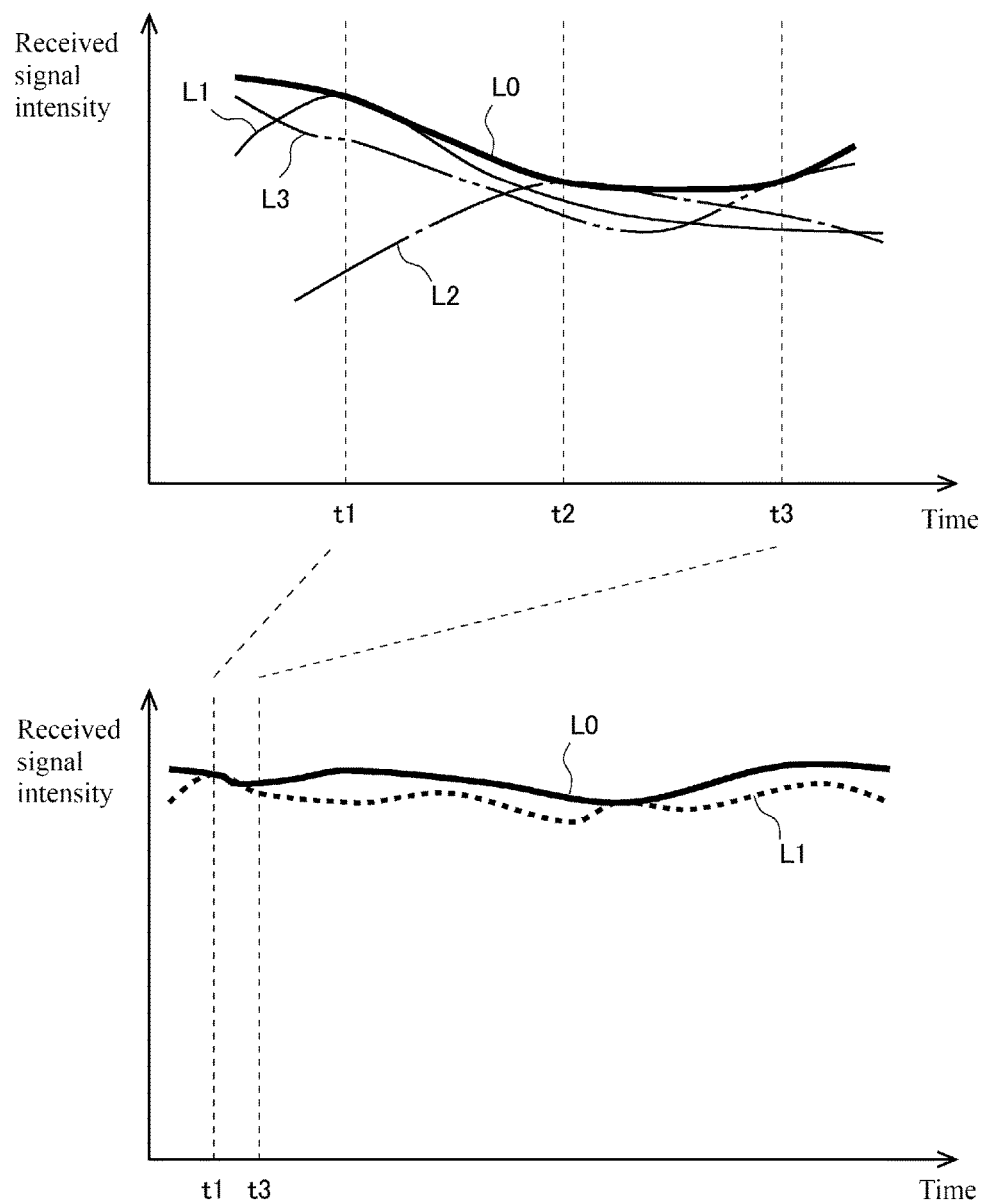
FIG. 5 is a diagram for illustrating a mode for producing directivity information through directivity information production processing shown in FIG. 4.

Then, in step S105, driving directivity information corresponding to the driving patterns is produced based on the measurement result for the received signal intensities measured in step S102 above. This production is executed by the driving directivity information production unit 103 of the radio 1. The production of this directivity information will be described with reference to FIG. 5. Note that in order to simplify the description, it is assumed that there are three directivities that can be set for the phased-array antenna of the radio 1 in the present embodiment. FIG. 5 shows temporal transition in the received signal intensity measured in step S102 when driving control is performed in accordance with a specific driving pattern (for example, Driving Pattern 1). Specifically, the top of FIG. 5 shows an enlarged view of a partial period (period from a control time t1 to a control time t3) of the bottom, and temporal transitions in the received signal intensities corresponding to three directivities set in the phased-array antenna are indicated by L1, L2, and L3.

As shown in FIG. 5, in the present embodiment, the state in which the received signal intensity is always high is not maintained at control times t1, t2, t3 . . . during the execution of Driving Pattern 1 in the case of a specific directivity. This shows that the specific directivity cannot ensure the state in which the received signal intensity is always suitable, due to the influence of fading caused by the execution of Driving Pattern 1. In view of this, in the present embodiment, driving directivity information corresponding to Driving Pattern 1 is produced by selecting, at the control times in the period during which Driving Pattern 1 is performed, the directivity with which the received signal has the maximum intensity, and lining up the selected directivities in time series. For example, in the example of Driving Pattern 1 shown in FIG. 5, the directivity indicated by the line L1 is selected at the control time t1, the directivity indicated by the line L2 is selected at the control time t2, the directivity indicated by the line L3 is selected at the control time t3, and the directivities with which the received signal has the maximum intensity are successively selected at the control times onward. Then, the selected directivities are lined up in time series, and driving directivity information corresponding to Driving Pattern 1 (that is, information formed in the order of L1 (t1), L2 (t2), L3 (t3) . . . ) is produced. Note that the temporal transition in the received signal intensity according to this driving directivity information is indicated by a line L0 in FIG. 5. The driving directivity information according to this line L0 enables wireless power supply in which the influence of fading caused by Driving Pattern 1 is suppressed, by appropriately controlling the directivity of the phased-array antenna at the control times.

The production of this driving directivity information is also similarly performed for remaining Driving Patterns 2 and 3. The driving directivity information that is produced in step S105 and corresponds to the driving patterns is stored in the memory by the directivity information storage unit 12 in step S106. At this time, as shown in FIG. 6, the driving patterns and the corresponding driving directivity information are stored in a state in which they are associated with each other. In the present embodiment, Driving Pattern 1 is associated with the driving directivity information S1 (information that can realize the transition in the received signal intensity indicated by the line L0 in FIG. 5 and in which the directivities at control times are lined up in time series), and Driving Patterns 2 and 3 are respectively associated with the driving directivity information S2 and the driving directivity information S3.

Note that in the production of the driving directivity information in step S105 above, the directivities with which the received signal has the maximum intensity at control times are selected, and are lined up in time series. Instead of this mode, the directivities may be selected at the control times such that the received signal intensity is in a predetermined range in a period during which the driving pattern is executed. Production of the driving directivity information in this manner makes it possible to suppress fluctuation in the received signal intensity in the radio 2a, to enable wireless power supply in which the influence of fading caused by a driving pattern is suppressed when power supply radio waves are transmitted from the radio 1, and accordingly, to drive the radio 2a and its sensor 22 due to stable power supply.

Also, because the above-described driving directivity information is produced based on test power supply radio waves transmitted from the radio 1 to the radio 2a, strictly speaking, the driving directivity information can be suitably utilized when the radio 1 transmits radio waves. However, in many cases, the directivity of the phased-array antenna at the time of transmission of radio waves from the radio 1 to the radio 2a and the directivity of the phased-array antenna at the time of transmission of radio waves from the radio 2a to the radio 1 can be considered to be the same. In view of this, based on this point, the driving directivity information corresponding to the driving patterns obtained through the above-described directivity information production processing may be applied to the phased-array antenna at the time of transmission of radio waves from the radio 2a to the radio 1.

Note that the relative position of the radio 2b with respect to the radio 1 is different from that of the radio 2a, and thus it is necessary to separately produce driving directivity information for wireless power supply from the radio 1 and the radio 2b. Note that in this production, the directivity information need only be produced substantially similarly to the case of the radio 2a.

Measurement Information Transfer Processing

The radio 1 has driving directivity information produced through the directivity information production processing shown in FIG. 4, and thus wireless power supply from the radio 1 to the radio 2a can be realized in the state in which the effect of fading caused by each driving pattern is suppressed in the state in which the driving of the robot 3a and the like is controlled by the control apparatus 5 in accordance with Driving Patterns 1 to 3. In view of this, power supply processing, which is one aspect of this wireless power supply, will be described with reference to FIG. 7. This power supply processing is processing that is executed by the radio 1, and in which power is supplied from the radio 1 to the radio 2a, measurement and transmission of temperature information by the sensor 22 provided in the radio 2a is executed.

First, in step S201, the driving pattern executed by the control apparatus 5 at this point in time is acquired by the acquisition unit 101. Thereafter, in step S202, the driving directivity information corresponding to the driving pattern acquired in step S201 is selected from pieces of information stored in the directivity information storage unit 12. For example, when the acquired driving pattern is Driving Pattern 1, the driving directivity information indicated by S1 is selected, when the acquired driving pattern is Driving Pattern 2, the driving directivity information indicated by S2 is selected, and when the acquired driving pattern is Driving Pattern 3, the driving directivity information indicated by S3 is selected.

Then, in step S203, the execution unit 102 applies the directivity information included in this driving directivity information to the phased-array antenna and controls its directivity in the state in which the control time in the selected driving directivity information and the time at which the driving of the robot 3a and the like is controlled by the control apparatus 5 in accordance with the driving pattern coincide with each other. The radio 1 transmits, to the radio 2a, together with power supply radio waves, a measurement instruction signal for causing the sensor of the radio 2a to measure and transmit the temperature information in a state in which the directivity is controlled.

Note that various known techniques can be utilized for the synchronization of the control time in the radio 1 and the time at which the driving is controlled by the control apparatus 5. For example, a configuration may be adopted in which in the processing of step S201, the acquisition unit 101 acquires a synchronization signal from the radio 1 together with the driving pattern from the control apparatus, and the processing of step S203 is started at time at which the execution of the driving pattern is started in this synchronization signal. Also, as another method, determination may be made such that the processing of step S203 is started at the elapse of a predetermined period of time after the acquisition unit 101 acquires the driving pattern from the control apparatus 5. Wireless communication control in the radio 1 that accompanies the above-described control of the directivity information and the driving control of the control apparatus 5 are suitably synchronized due to programming that causes the control apparatus 5 to execute this driving pattern at the elapse of the predetermined period of time.

When power supply radio waves are transmitted in the processing of step S203, power is supplied to the radio 2a in the state in which the effect of fading is suppressed, the sensor 22 is started up with the received measurement instruction signal, and measurement and transmission of temperature information are performed. As a result, the radio 1 receives the temperature information from the radio 2a (processing of step S204). By performing wireless power supply on the radio 2a along with such directivity control, power is supplied to the radio 2a in a state in which the radio 2a is not easily influenced by fading caused by the driving pattern by the control apparatus 5, and as a result, the sensor 22 is reliably started up, and accordingly, the radio 1 can reliably receive temperature information from the radio 2a and can stably collect information. In particular, in the present embodiment, when power supply radio waves are transmitted from the radio 1 to the radio 2a, and when the radio 1 receives temperature information from the radio 2a, the above-described selected driving directivity information is applied to the phased-array antenna. Thus, it is possible to suitably avoid the influence of fading caused by the driving pattern by the control apparatus 5 and to realize reliable information collection utilizing the radio 2a having a rectenna.

Figure 7:
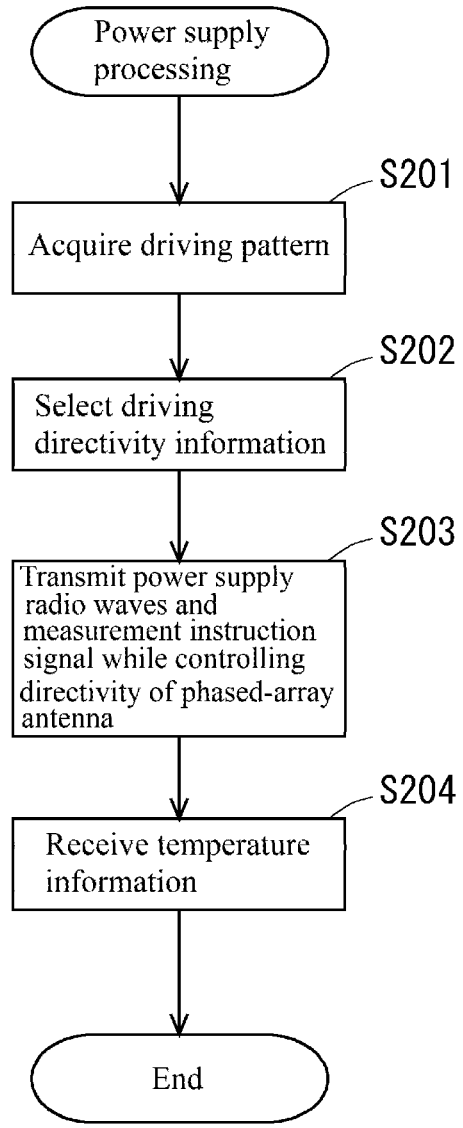
FIG. 7 is a flowchart of processing for supplying power from the radio 1 to the radio 2a, in order to transmit information on temperature measured by the radio 2a to the radio 1 in the wireless power supply control system shown in FIG. 1.

Also, the power supply processing shown in FIG. 7 is applied to wireless power supply from the radio 1 to the radio 2b. Moreover, if the radio 2a and the radio 2b are disposed relatively closely, driving directivity information applied to wireless power supply from the radio 1 to the radio 2a and wireless power supply from the radio 1 to the radio 2b may be used as shared directivity information. That is, in the radio group constituted by the radio 2a and the radio 2b, if the two radios are close to each other, the relative positions thereof with respect to the radio 1 do not have a large difference in some cases, and the influence of fading between radios can be considered to be the same. In such a case, the load of power supply processing can be reduced by making the directivity information applied to the phased-array antenna of the radio 1 shared in wireless power supply from the radio 1 to each radio belonging to the radio group. Note that if the shared driving directivity information is applied, wireless power supply from the radio 1 to the radio 2a and the wireless power supply from the radio 1 to the radio 2b may be performed alternatively or may be performed simultaneously.

Modification

Although the position of the radio 2a does not change in the above-described embodiment, instead of this, the radio 2a may be configured to move by a motor or the like whose driving is controlled by the control apparatus 5 in accordance with a driving pattern. In this mode, the relative position of the radio 2a with respect to the radio 1 is linked with the time axis of the driving pattern by the control apparatus 5. The driving directivity information produced through the above-described directivity information production processing is formed by selecting suitable directivity at predetermined control time in the driving pattern, and thus applying this driving directivity information to the phased-array antenna in such a mode makes it possible to protect wireless power supply from the radio 1 to the radio 2a from the influence of fading caused by the driving pattern and to realize suitable wireless power supply.

INDEX TO THE REFERENCE NUMERALS 1, 2a, 2b Radio
3 Robot
4 Motor
5 Control apparatus
100 Wireless power supply control system (system)

The invention claimed is:

1. A wireless power supply control system comprising:
a control apparatus that controls driving of one or more driving devices in accordance with a plurality of predetermined driving patterns;
a first radio comprising a directional antenna and capable of performing predetermined wireless power supply via the directional antenna;
a second radio capable of receiving power supply radio waves for the predetermined wireless power supply and being driven by power of the power supply radio waves, the power supply radio waves being transmitted from the first radio;
a directivity information memory that stores driving directivity information relating to a directivity, the driving directivity information being applied to the directional antenna of the first radio in relation to the predetermined wireless power supply from the first radio to the second radio in accordance with the plurality of predetermined driving patterns in a state in which driving of the one or more driving devices is controlled by the control apparatus in accordance with the plurality of predetermined driving patterns; and
an arithmetic unit configured with a program to perform operations comprising:
operation as an acquisition unit that acquires, from the control apparatus, a target driving pattern comprising a driving pattern among the plurality of predetermined driving patterns that the control apparatus applies to the one or more driving devices; and
operation as an execution unit that selects, from among pieces of the driving directivity information stored in the directivity information memory, target driving directivity information corresponding to the target driving pattern acquired by the acquisition unit, applies the selected target driving directivity information to the directional antenna of the first radio, and executes the predetermined wireless power supply from the first radio to the second radio.

2. The wireless power supply control system according to claim 1,
wherein the arithmetic unit is configured with the program to perform operations such that:
operation as the acquisition unit comprises operation as the acquisition unit that acquires, in addition to the target driving pattern, information relating to an execution time at which the target driving pattern is executed in the one or more driving devices by the control apparatus, and
operation as the execution unit comprises operation as the execution unit that executes the predetermined wireless power supply based on the execution time via the directional antenna of the first radio to which the target driving directivity information is applied.

3. The wireless power supply control system according to claim 1,
wherein the first radio transmits a predetermined control signal to the second radio together with the power supply radio waves,
the second radio transmits a signal relating to a control result to the first radio based on the power supply radio waves and the predetermined control signal from the first radio, and
the same target driving directivity information is applied to the directional antenna at a time of transmitting the power supply radio waves and the predetermined control signal and at the time of receiving the signal relating to the control result.

4. The wireless power supply control system according to claim 1,
wherein the target driving directivity information comprises information relating to a directivity that is applied to the directional antenna of the first radio, the directivity being set such that a received signal received by the second radio has a maximum intensity or is in a predetermined received signal intensity range at a plurality of control times that are set in an execution period during which the target driving pattern is executed.

5. The wireless power supply control system according to claim 1,
wherein the second radio is disposed on the driving device whose driving is controlled by the control apparatus, and a relative position of the second radio with respect to the first radio changes due to the driving device being moved in accordance with the target driving pattern, and
the target driving directivity information is produced in a situation in which the relative positions of the second radio and the first radio change.

6. The wireless power supply control system according to claim 1,
wherein positions of the first radio and the second radio do not change relative to each other.

7. The wireless power supply control system according to claim 1, comprising:
a plurality of the second radios,
wherein the plurality of the second radios are each capable of alternatively performing the predetermined wireless power supply to the first radio,
the directivity information memory stores the driving directivity information that corresponds to the plurality of the second radios and is applied to the directional antenna of the first radio in relation to the predetermined wireless power supply from the first radio to the plurality of the second radios in accordance with the plurality of predetermined driving patterns in a state in which driving of the one or more driving devices is controlled by the control apparatus in accordance with the plurality of predetermined driving patterns, and
the arithmetic unit is configured with the program to perform operations such that operation as the execution unit comprises operation as the execution unit that selects, from among the pieces of the driving directivity information stored in the directivity information memory, target driving directivity information that corresponds to the target driving pattern acquired by the acquisition unit and corresponds to the plurality of the second radios, and executes the predetermined wireless power supply from the first radio to the plurality of the second radios in accordance with the selected target driving directivity information.

8. The wireless power supply control system according to claim 1, comprising:
a plurality of the second radios,
wherein a second radio group comprising the plurality of the second radios is capable of performing the predetermined wireless power supply with respect to the first radio,
the directivity information memory stores the driving directivity information that corresponds to the second radio group and is applied to the directional antenna of the first radio in relation to the predetermined wireless power supply from the first radio to the second radio group in accordance with the plurality of predetermined driving patterns in a state in which driving of the one or more driving devices is controlled by the control apparatus in accordance with the plurality of predetermined driving patterns, and
the arithmetic unit is configured with the program to perform operations such that operation as the execution unit comprises operation as the execution unit that selects, from among the pieces of the driving directivity information stored in the directivity information memory, target driving directivity information that corresponds to the target driving pattern acquired by the acquisition unit and corresponds to the second radio group, and executes the predetermined wireless power supply from the first radio to the second radio group in accordance with the selected target driving directivity information.

9. The wireless power supply control system according to claim 1,
wherein the second radio comprises a sensor-equipped radio comprising a sensor that is driven by power of the power supply radio waves so as to measure a predetermined environmental parameter.

10. The wireless power supply control system according to claim 1,
wherein the directional antenna comprises a phased-array antenna.

11. A wireless power supply control apparatus that controls predetermined wireless power supply performed by a first radio capable of performing the predetermined wireless power supply to a second radio via a directional antenna in a predetermined environment in which driving of one or more driving devices is controlled by a control apparatus in accordance with a plurality of predetermined driving patterns,
the second radio capable of receiving power supply radio waves for the predetermined wireless power supply and being driven by power of the power supply radio waves, the power supply radio waves being transmitted from the first radio,
the wireless power supply control apparatus comprising:
a directivity information memory that stores driving directivity information relating to a directivity, the driving directivity information being applied to the directional antenna of the first radio in relation to the predetermined wireless power supply from the first radio to the second radio in accordance with the plurality of predetermined driving patterns in a state in which driving of the one or more driving devices is controlled by the control apparatus in accordance with the plurality of predetermined driving patterns; and
an arithmetic unit configured with a program to perform operations comprising:
operation as an acquisition unit that acquires, from the control apparatus, a target driving pattern that is the driving pattern among the plurality of predetermined driving patterns that the control apparatus applies to the one or more driving devices; and
operation as an execution unit that selects, from among pieces of the driving directivity information stored in the directivity information memory, target driving directivity information corresponding to the target driving pattern acquired by the acquisition unit, applies the selected target driving directivity information to the directional antenna of the first radio, and executes the predetermined wireless power supply from the first radio to the second radio.

12. The wireless power supply control apparatus according to claim 11,
wherein the wireless power supply control apparatus is included in the first radio.

13. A wireless power supply control method for controlling predetermined wireless power supply performed by a first radio capable of performing the predetermined wireless power supply to a second radio via a directional antenna in a predetermined environment in which driving of one or more driving devices is controlled by a control apparatus in accordance with a plurality of predetermined driving patterns,
the second radio capable of receiving power supply radio waves for the predetermined wireless power supply and being driven by power of the power supply radio waves, the power supply radio waves being transmitted from the first radio,
the wireless power supply control method comprising:
acquiring, from the control apparatus, a target driving pattern that is the driving pattern among the plurality of predetermined driving patterns that the control apparatus applies to the one or more driving devices;
selecting, from among pieces of driving directivity information relating to a directivity, target driving directivity information corresponding to the acquired target driving pattern, the target driving directivity information being applied to the directional antenna of the first radio in relation to the predetermined wireless power supply from the first radio to the second radio in accordance with the plurality of predetermined driving patterns in a state in which driving of the one or more driving devices is controlled by the control apparatus in accordance with the plurality of predetermined driving patterns; and
applying the selected target driving directivity information to the directional antenna of the first radio and executing the predetermined wireless power supply from the first radio to the second radio.

14. A directivity information production method for producing directivity information that is applied to a directional antenna in predetermined wireless power supply control performed by a first radio capable of performing the predetermined wireless power supply to a second radio via the directional antenna in a predetermined environment in which driving of one or more driving devices is controlled by a control apparatus in accordance with a plurality of predetermined driving patterns, the second radio capable of receiving power supply radio waves for the predetermined wireless power supply and being driven by power of the power supply radio waves, the power supply radio waves being transmitted from the first radio, the directivity information production method comprising:

transmitting test radio waves at a plurality of control times that are set in an execution period during which a driving pattern is executed, from the first radio to the second radio, in a state in which driving of the one or more driving devices is controlled by the control apparatus in accordance with the plurality of predetermined driving patterns;

measuring a received signal intensity for the test radio waves when the second radio receives the test radio waves transmitted from the first radio; and producing driving directivity information relating to a directivity in accordance with the plurality of predetermined driving patterns, the driving directivity information being applied to the directional antenna of the first radio in relation to the predetermined wireless power supply from the first radio to the second radio in a state in which driving of the one or more driving devices is controlled by the control apparatus in accordance with the plurality of predetermined driving patterns such that a received signal measured at the plurality of control times has a maximum intensity or is in a predetermined received signal intensity range.

* * * * *